US008155583B2

(12) United States Patent
Alfred et al.

(10) Patent No.: US 8,155,583 B2
(45) Date of Patent: Apr. 10, 2012

(54) METHOD AND APPARATUS FOR PROVIDING BROADBAND SIGNALS TO A PORTABLE USER DEVICE

(75) Inventors: Joseph A. Alfred, Somerset, NJ (US); Joseph M. Sommer, Rutherford, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 675 days.

(21) Appl. No.: 11/590,081

(22) Filed: Oct. 31, 2006

(65) Prior Publication Data

US 2008/0101304 A1    May 1, 2008

(51) Int. Cl.
*H04B 7/185* (2006.01)
(52) U.S. Cl. ....... 455/12.1; 370/312; 455/3.06; 455/101
(58) Field of Classification Search ........................ None
See application file for complete search history.

(56) References Cited

U.S. PATENT DOCUMENTS

| | | | |
|---|---|---|---|
| 5,781,856 A | 7/1998 | Jacobs et al. | |
| 6,018,528 A | 1/2000 | Gitlin et al. | |
| 6,064,662 A | 5/2000 | Gitlin et al. | |
| 6,088,408 A | 7/2000 | Calderbank et al. | |
| 6,115,427 A | 9/2000 | Calderbank et al. | |
| 6,127,971 A | 10/2000 | Calderbank et al. | |
| 6,178,196 B1 | 1/2001 | Naguib et al. | |
| 6,430,231 B1 | 8/2002 | Calderbank et al. | |
| 6,473,393 B1 | 10/2002 | Ariyavisitakul et al. | |
| 6,549,585 B2 | 4/2003 | Naguib et al. | |
| 6,584,593 B1 | 6/2003 | Seshadri et al. | |
| 6,587,515 B1 | 7/2003 | Jafarkhani et al. | |
| 6,661,856 B1 | 12/2003 | Calderbank et al. | |
| 6,693,982 B1 | 2/2004 | Naguib et al. | |
| 6,804,312 B1 | 10/2004 | Win et al. | |
| 6,870,882 B1 | 3/2005 | Al-Dhahir et al. | |
| 2002/0132575 A1* | 9/2002 | Kesling et al. | 455/2.01 |
| 2003/0022624 A1* | 1/2003 | Sato | 455/13.1 |
| 2005/0085195 A1* | 4/2005 | Tong et al. | 455/101 |
| 2005/0130586 A1* | 6/2005 | Gnuschke et al. | 455/3.06 |
| 2005/0213526 A1* | 9/2005 | Malkemes et al. | 370/312 |
| 2005/0254442 A1* | 11/2005 | Proctor et al. | 370/294 |
| 2006/0025073 A1* | 2/2006 | Benco et al. | 455/12.1 |
| 2006/0059559 A1* | 3/2006 | Dyson | 726/26 |

FOREIGN PATENT DOCUMENTS

EP     1 701 464 A1   9/2006
WO  WO 02/097585 A2  12/2002

OTHER PUBLICATIONS

PCT International Search Report corresponding to PCT Patent Application PCT/US2007/022282 filed Oct. 17, 2007 (3 pages).
PCT Written Opinion of the International Searching Authority corresponding to PCT Patent Application PCT/US 2007/022282 filed Oct. 17, 2007 (6 pages).

* cited by examiner

*Primary Examiner* — Rafael Pérez-Gutiérrez
*Assistant Examiner* — Daniel Nobile

(57) ABSTRACT

A method and apparatus for providing broadband signals to a portable user device is disclosed. Broadband signals, such as satellite radio signals, are received at a base station having a plurality of antennas. The content of the broadband signals are then encoded using space time coding (STC), and the STC encoded broadband content is transmitted from the plurality of antennas via a first wireless network protocol. The STC encoded broadband content can be received at a portable user device having a plurality of antennas or at a wireless access point having a plurality of antennas, which then transmit the broadband signals via a second wireless network protocol.

25 Claims, 3 Drawing Sheets

METHOD AND APPARATUS FOR PROVIDING BROADBAND SIGNALS TO A PORTABLE USER DEVICE

BACKGROUND OF THE INVENTION

The present invention is directed to providing broadband signals to a portable user device. More specifically, the present invention is directed to a method and apparatus for providing broadband signals, such as satellite radio signals, to a portable user device, such as a potable digital assistant (PDA), cell phone, etc., using space time coding.

Satellite radio signals are broadcast signals transmitted via a space-based satellite to a receiving device. A satellite radio receiver is a digital radio that receives signals broadcast by a satellite over a satellite radio channel. Satellite radio signals cover a much larger range than terrestrial radio signals. Satellite radio signals typically are broadcast using a 2.3 GHz S band in North America and sharing a 1.4 GHz L band elsewhere.

Satellite radio services are typically offered by business entities as a package of satellite radio channels that require a subscription to access. Such satellite radio channels contain satellite radio content, which can include various types of music, talk, etc. Each satellite radio receiver has a unique electronic serial number (ESN) to identify it. When a user subscribes to a satellite radio service, a subscription is associated with the ESN of user's satellite radio receiver. The ESN of associated with the subscription is then included in an authorization code that is transmitted with the satellite radio signals from the satellite. The satellite radio signals transmitted from the satellite cannot be accessed by receiver whose ESN is not identified in the authorization code. Accordingly, the authorization code is received by satellite radio receivers and allows a receiver identified by its ESN in the authorization code to access the satellite radio content.

Many portable user devices typically use narrowband technology for transmitting and receiving wireless signals. Because satellite radio signals are broadcast at a broadband frequency rather than a narrowband frequency, portable user devices cannot reliably act as receivers for the broadband satellite radio signals.

BRIEF SUMMARY OF THE INVENTION

The present invention provides a method and apparatus for reliably providing broadband signals to portable user devices. This is achieved by transmitting the broadband signals to portable user devices using space time coding (STC).

The present invention allows a wireless network provider to satellite radio content to multiple portable user devices with a single satellite radio subscription. Accordingly, the wireless network provider can offer satellite radio, or other broadband services, to users without the users individually subscribing to a satellite radio service.

In one embodiment of the present invention broadband signals containing broadband content are received at a base station having a plurality of antennas. The base station encodes the broadband content using STC, and the STC encoded broadband content is transmitted from the plurality of antennas via a first wireless network protocol. The transmitted STC encoded broadband content can be received by a portable user device having a plurality of antennas. The portable user device then decodes the STC encoded broadband content. The transmitted STC encoded broadband content can also be received at an access point having a plurality of antennas, which receive the STC encoded broadband content and transmit the broadband content via a second wireless network protocol. The access point can transmit the STC encoded broadband content from its antennas via the second wireless network protocol or decode the STC encoded broadband content and transmit the decoded broadband content from its antennas via the second wireless network protocol.

According to one embodiment of the present invention, the broadband signals are satellite radio signals containing satellite radio content. It is possible that the satellite radio signals are received at the base station via at least one of the plurality of antennas used to transmit the STC encoded signals. The base station is associated with an electronic serial number (ESN), which is associated with an active satellite radio subscription that allows access to the satellite radio content contained in the satellite radio signals. The satellite radio content is encoded using STC and the STC encoded content is transmitted from the plurality of antennas via the first wireless network protocol. Thus, it is possible to provide satellite radio content to multiple portable user devices with a single subscription associated with the base station.

These and other advantages of the invention will be apparent to those of ordinary skill in the art by reference to the following detailed description and the accompanying drawings.

DETAILED DESCRIPTION

The present invention is directed to providing content of broadband signals, such as satellite radio signal, to portable user devices, such as personal digital assistants (PDAs), cell phones, etc. Although the present invention is described herein as providing content of satellite radio signals to portable user devices, the present invention is not limited to satellite radio signals and may be applied to any broadband signals.

Figure 1:
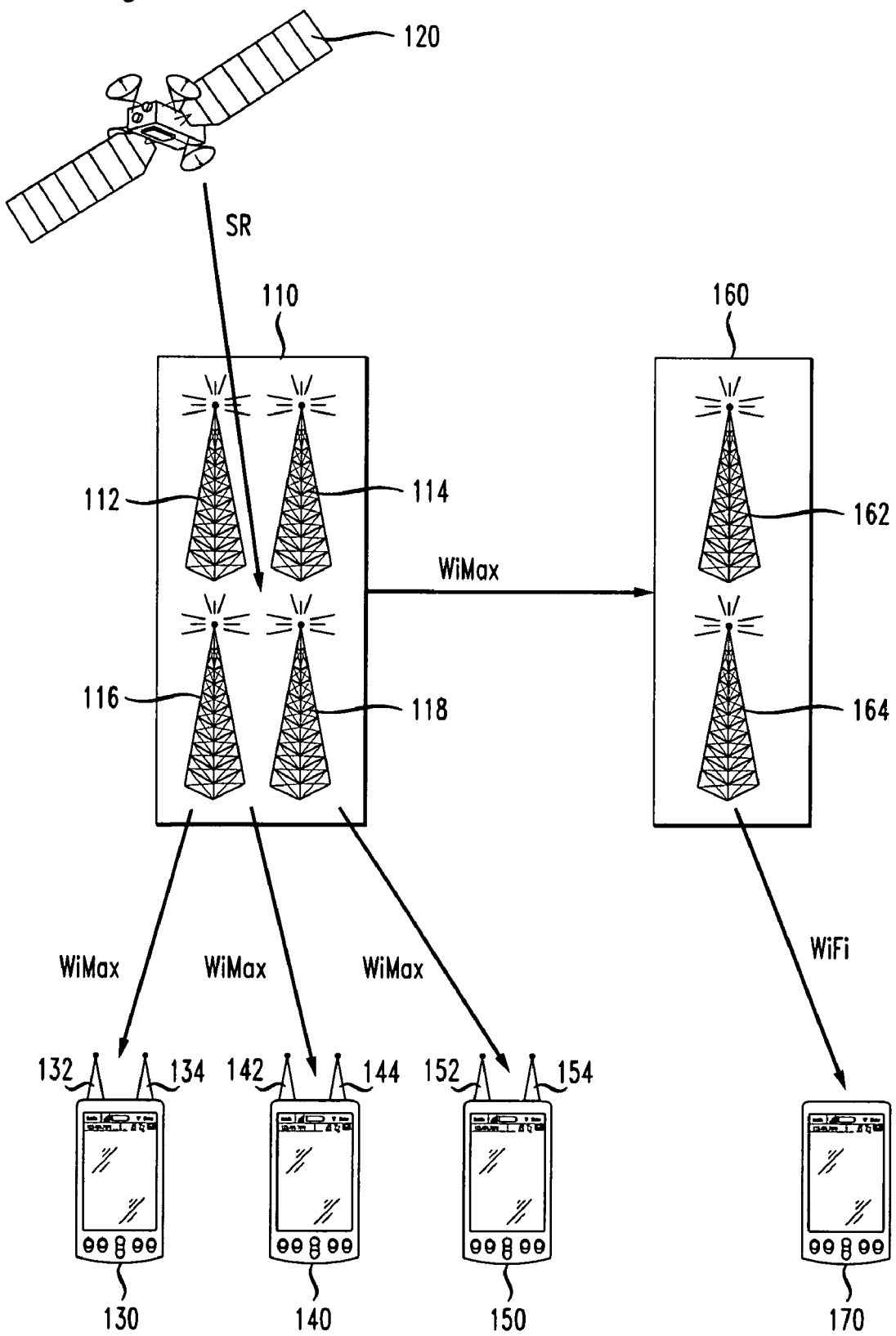
FIG. 1 illustrates apparatus for providing satellite radio signals to portable user devices according to an embodiment of the present invention.

FIG. 1 illustrates apparatus for providing satellite radio signals to portable user devices according to an embodiment of the present invention. As illustrated in FIG. 1, a base station 110 includes a plurality of antennas 112, 114, 116, and 118. These antennas 112, 114, 116, and 118 make up a space time coding (STC) transmission unit. STC is a method employed to improve the reliability of data transmission in wireless communication systems using multiple transmission antennas. STC methods rely on transmitting multiple redundant copies of a data stream from the transmission antennas so that at least some of the redundant copies may survive the physical path between transmission and reception in a good enough state to allow reliable decoding. For example, U.S. Pat. No. 6,115,427 to Calderbank et al. discloses a Method and Apparatus for Data Transmission Using Space-Time Codes and Multiple Transmit Antennas. Data is encoded at the base station 110 using STC to generate an STC code, such as a trellis code. The STC code is distributed over the multiple antennas 112, 114, 116, and 118 at the base station 110 in order to transmit multiple redundant copies of the encoded data from the multiple antennas 112, 114, 116, and 118. Although four antennas 112, 114, 116, and 118 are illustrated in FIG. 1, this number of antennas may be varied according to the STC algorithm used.

Figure 2:
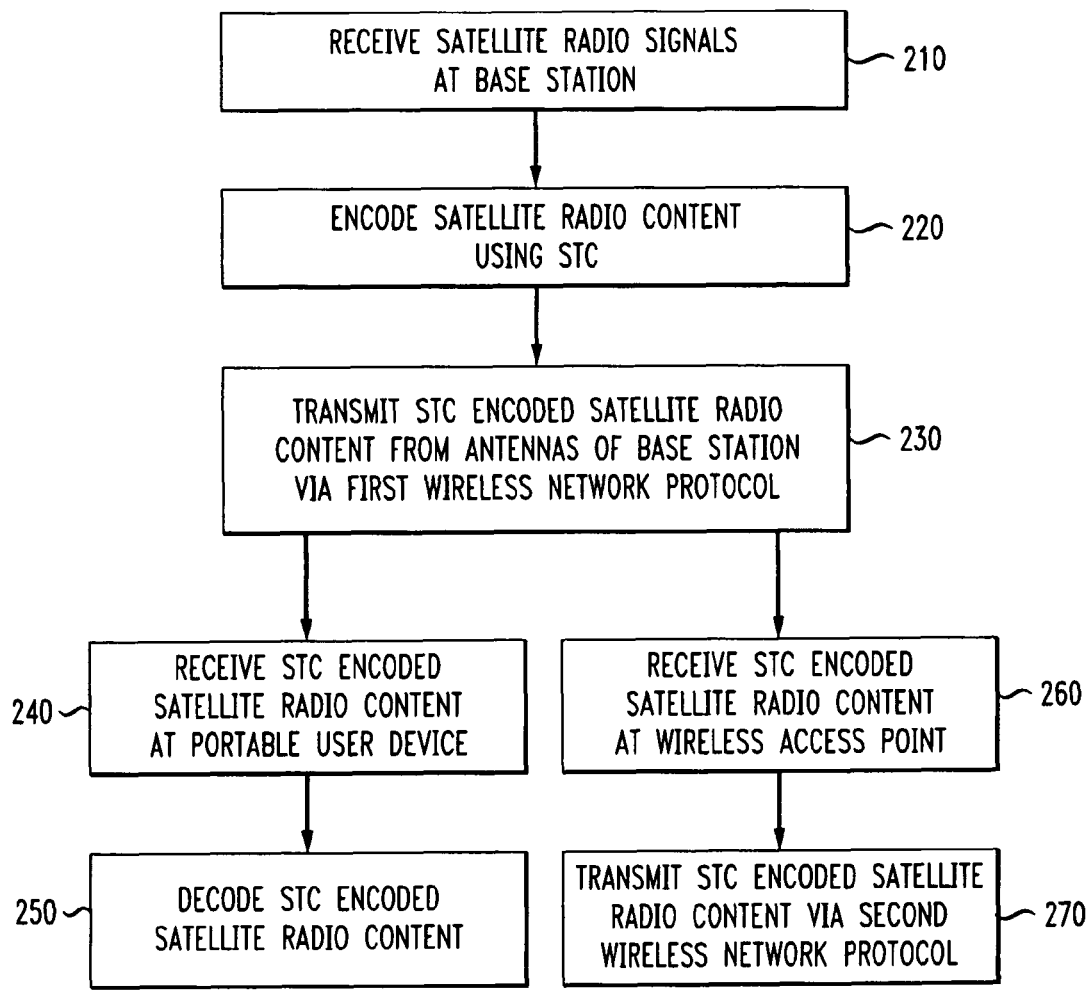
FIG. 2 a method of providing satellite radio signals to portable user devices according to an embodiment of the present invention.

FIG. 2 illustrates a method of providing content of satellite radio signals to portable user devices according to an embodiment of the present invention. This method is described while referring to FIGS. 1 and 2. At step 210, satellite radio signals are received at a base station 110. The satellite radio signals are transmitted from a satellite 120 and contain satellite radio content. Satellite radio content can include radio programming such as music and talk, but is not limited thereto. According to the embodiment of FIG. 1, one or more of the antennas 112, 114, 116, and 118 of the STC transmission group acts as a receiving antenna for the satellite radio signals in order to receive the satellite radio signals at the base station 110. However, it is also possible that a separate antenna from the STC transmission group be used to receive the satellite radio signals at the base station 110.

The base station 110 is associated with a unique electronic serial number (ESN). The ESN associated with the base station 110 is associated with a subscription to a satellite radio service that provides the satellite radio content in the satellite radio signals. When this subscription is activated, the ESN of the base station 110 is then included in an authorization code that is transmitted with the satellite radio signals from the satellite 120. The authorization code is received by the base station 110 with the satellite radio signals. Since the ESN of the base station 110 is identified in the authorization code, the base station 110 can then access the satellite radio content contained in the satellite radio signals received from the satellite 120.

At step 220, the satellite radio content is encoded using STC at the base station 110. As described above, the satellite radio signals contain satellite radio content which is accessible based on the subscription associated with the ESN that is associated with the base station 110. This satellite radio content is encoded using an STC algorithm. For example, the satellite radio signals can be encoded using a space time trellis code, which provides by both temporal and spatial diversity when transmitting from the multiple antennas 112, 114, 116, and 118 of the base station.

At step 230, the STC encoded satellite radio content is transmitted from the multiple antennas 112, 114, 116, and 118 of the base station 110 via a first wireless network protocol. For example, as illustrated in FIG. 1, the antennas 112, 114, 116, and 118 of the base station 110 can transmit the STC encoded satellite radio content using the IEEE 802.16 standard commonly known as WiMax. Accordingly, WiMax signals containing the STC encoded satellite radio content are transmitted from the antennas 112, 114, 116, and 118 over a range of the base station 110. Although FIG. 1 illustrates WiMax being used as the first wireless network protocol, the present invention is not limited thereto.

At step 240, the STC encoded satellite radio content transmitted via the first wireless network protocol is received at a portable user device having a plurality of antennas which function as an STC receiving unit. As illustrated in FIG. 1, portable user devices 130, 140, and 150 each have two antennas 132 and 134, 142 and 144, and 152 and 154, respectively, for receiving the WiMax signals transmitted from the antennas 112, 114, 116, and 118 of the base station 110 and containing the STC encoded satellite radio content. Although the portable user devices 130, 140, and 150 are shown as each having two antennas 132 and 134, 142 and 144, and 152 and 154, respectively, the number of antennas on each portable user device may vary.

At step 250, the portable user device decodes the STC encoded satellite radio content. STC decoding decodes STC encode data to reproduce the data that was STC encoded before being transmitted. This may require the portable user device to have additional functionality, such as STC decoding software, hardware, etc. Once the satellite radio content is decoded a user of the portable user device can listen to the satellite radio content. The user of the portable user device has full access to the satellite radio content even without an individual subscription to the satellite radio service for that user. For example, in FIG. 1, portable user devices 130, 140, and 150 decode the STC encoded satellite radio content included in the WiMax signals transmitted from the base station 110. Since the base station 110 accesses the satellite radio content contained in the satellite radio signals using a subscription associated with the ESN of the base station 110, the portable user devices 130, 140, and 150 have access to the satellite radio content without a separate subscription for each portable user device 130, 140, and 150. However, the portable user devices 130, 140, and 150 may require a subscription to receive the wireless signals from the base station 110. Thus, a wireless network service provider can provide the satellite radio content as part of the wireless network service. In this case, the base station 110 can store a user profiles associated with the ESN of each portable user device with a subscription to the wireless network service. The user profile can including information relating to billing, security and user preferences for the user of the corresponding portable user device.

At step 260, the STC encoded satellite radio content transmitted via the first wireless network protocol is received at a wireless access point having a plurality of antennas which function as an STC receiving unit. As illustrated in FIG. 1, wireless access point 160 includes antennas 162 and 164 for receiving the WiMax signals transmitted from the antennas 112, 114, 116, and 118 of the base station 110 and containing the STC encoded satellite radio content.

At step 270, the wireless access point transmits the STC encoded satellite radio content via a second wireless network protocol. For example, as illustrated in FIG. 1, the antennas 162 and 164 of the wireless access point 160 can transmit the satellite radio content using the IEEE 802.11 standard commonly known as WiFi. Accordingly, WiFi signals containing the STC encoded satellite radio content are transmitted from the antennas 162 and 164, and the wireless access point 160 has a range determined by the WiFi signals. As known in the art, WiFi has a significantly smaller range than WiMax. Thus, the wireless access point 160 can generate a Wireless Local Area Network (WLAN) or a "hotspot" where users can access the satellite radio content. For example, the wireless access point 160 can create a "hotspot" for a particular business, building, etc. As illustrated in FIG. 1, portable user device 170 receives the WiFi signals transmitted from the wireless access point 160 and containing the satellite radio content. According to one embodiment of the present invention, the STC encoded satellite radio content can be decoded at the wireless access point 160 and then transmitted using the second wireless network protocol. However, according to another embodiment of the present invention, the STC encoded satellite radio content is transmitted via the second wireless network protocol and decoded by a portable user device which receives the satellite radio content via the second wireless network protocol.

Figure 3:
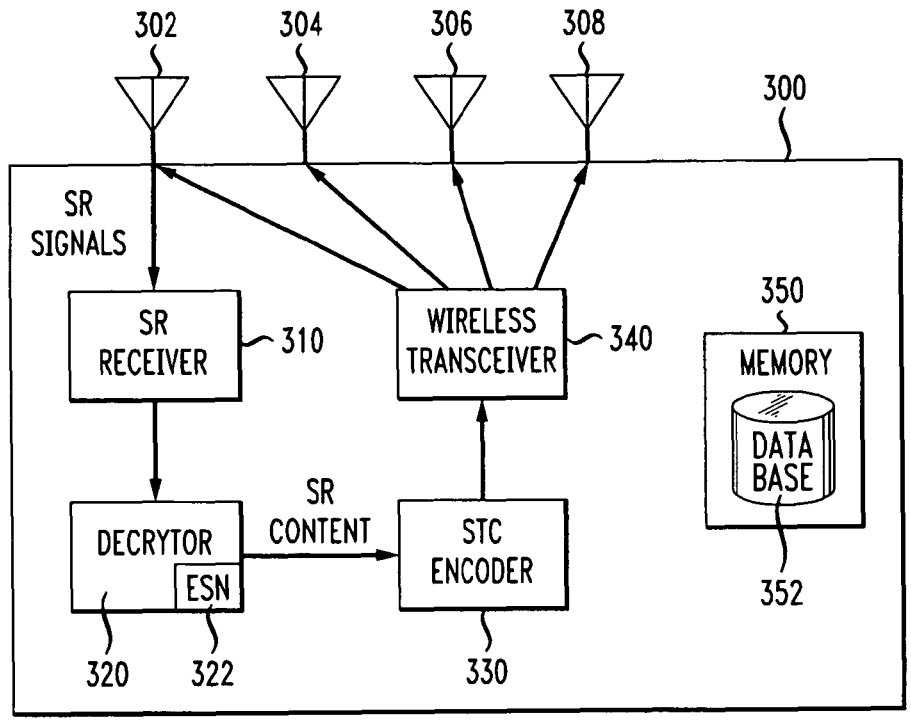
FIG. 3 illustrates a functional block diagram of a base station according to an embodiment of the present invention.

FIG. 3 illustrates a functional block diagram of a base station 300 according to an embodiment of the present invention. As illustrated in FIG. 3, the base station 300 includes antennas 302, 304, 306, and 308. A satellite radio receiver 310 is connected to an antenna 302 and receives satellite radio signals which are transmitted from a satellite. The satellite radio signals may be encrypted so the satellite radio content contained in the satellite radio signals can only be accessed with an active subscription. The satellite radio signals are decrypted by a decryptor 320 in order to access the satellite radio content. The decryptor 320 uses the ESN 322 associated with the base station 300 to decrypt the satellite radio signals. As described above, since the ESN 322 of the base station 300 is associated with an active satellite radio subscription, the decryptor 320 can access the satellite radio content contained in the satellite radio signals. The decryptor 320 may be implemented using computer program instructions executed by a processor of the base station 300. The satellite radio content is then encoded using STC by an STC encoder 330. The STC encoder 330 may also be implemented using computer program instructions executed by a processor of the base station 300. A wireless transceiver 340 transmits the STC encoded satellite radio content using the antennas 302, 304, 306, and 308 via a wireless network protocol, such as WiMax, WiFi, etc. The wireless transceiver 340 is also capable of receiving data via the wireless network protocol, such as communications from portable user devices. As illustrated in FIG. 3, antenna 302 is used to receive the satellite radio signals and to transmit the STC encoded satellite radio content. However, a separate antenna from the antennas 302, 304, 206, and 308 used to transmit the STC encode satellite radio content may be used to receive the satellite radio signals. The base station 300 can also include a memory 350. The memory 350 includes a database 352 for storing user profiles associated with ESNs of portable user devices having subscriptions for wireless network services. The user profiles can include information relating to billing, security (i.e., speaker verification), and user preferences. This information can be transmitted from the portable user devices and received via the wireless transceiver 340. The base station 300 acts as a home base station for users who reside within a range of the base station 300. The base station 300 stores the user profiles for the users for which the base station 300 is the home base station.

Figure 4:
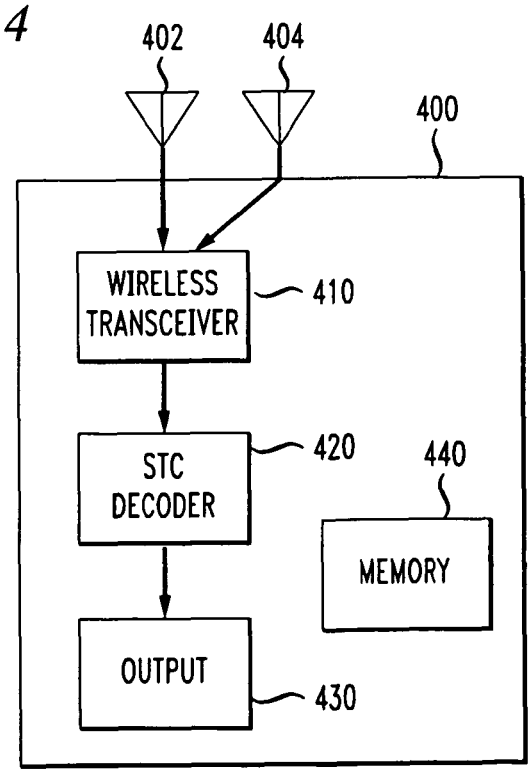
FIG. 4 illustrates a functional block diagram of a portable user device according to an embodiment of the present invention.

FIG. 4 illustrates a functional block diagram of a portable user device 400 according to an embodiment of the present invention. As illustrated in FIG. 4, the portable user device 400 includes antennas 402 and 404 which are connected to a wireless transceiver 410 for receiving the STC encoded satellite radio content transmitted via a wireless network protocol, such as WiMax, WiFi, etc. The wireless transceiver 410 is also capable of transmitting data, such as information relating to billing, security and user preferences to a base station via the wireless network protocol. An STC decoder 420 decodes the STC encoded satellite radio content. The STC decoder 420 may be implemented as computer program instructions executed by a processor of the portable user device 400. The portable user device further includes an output 430, such as speakers, a display, etc., to deliver the decoded satellite radio content to a user. The portable user device 400 can also include a memory 440 for storing various information. For example, the memory 440 can store a user profile including information relating to billing, security, and user preferences for a wireless network service subscription. This user profile can be transmitted to a base station by the wireless transceiver 410. The portable user device 400 is associated with an ESN which is used to uniquely identify the portable user device 400.

As described above, according to embodiments of the present invention, a single satellite radio subscription associated with a base station can be used to provide satellite radio content to multiple portable user devices within a range of a wireless network protocol used to transmit the satellite radio content from the base station. This allows a telecommunications service provider providing wireless network service to portable user devices of customers to provide access to satellite radio as part of the wireless network service.

Although embodiments of the present invention described above use an STC scheme in which there are four STC transmission antennas and two STC receiving antennas, the present invention is not limited thereto. One skilled in the art will recognize that various other STC schemes can be used having different numbers of STC transmission and receiving antennas.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
receiving satellite radio signals containing satellite radio content directly by a base station comprising a first plurality of antennas, wherein the base station is deployed in a wireless network, wherein the base station is associated with an electronic serial number, and the electronic serial number is associated with an active satellite radio subscription which allows access to the satellite radio content contained in the satellite radio signals, wherein the satellite radio signals are provided by an entity that is different from an entity that provides the wireless network;
encoding the satellite radio content using space time coding; and
transmitting the space time coding encoded satellite radio content from the first plurality of antennas via a first wireless network protocol to a plurality of portable user devices, to allow each of the plurality of portable user devices to access the satellite radio content without individual active satellite radio subscriptions, wherein users of the plurality of portable user devices are subscribers of the wireless network.

2. The method of claim 1, further comprising:
receiving the space time coding encoded satellite radio content at a portable user device comprising a second plurality of antennas; and
decoding the space time coding encoded satellite radio content at the portable user device.

3. The method of claim 1, further comprising:
receiving the space time coding encoded satellite radio content at a second plurality of antennas; and
transmitting the space time coding encoded satellite radio content from the second plurality of antennas via a second wireless network protocol.

4. The method of claim 3, wherein the first wireless network protocol is an IEEE 802.16 protocol and the second wireless network protocol is an IEEE 802.11 protocol.

5. The method of claim 1, further comprising:
- receiving the space time coding encoded satellite radio content at a second plurality of antennas;
- decoding the space time coding encoded satellite radio content; and
- transmitting the decoded satellite radio content from the second plurality of antennas via a second wireless network protocol.

6. The method of claim 1, wherein the receiving satellite radio signals comprises:
- receiving the satellite radio signals via at least one of the first plurality of antennas.

7. The method of claim 1, further comprising:
- storing a plurality of user profiles, each user profile corresponding to an identifier of a portable user device of the plurality of portable user devices.

8. The method of claim 7, wherein each user profile includes information relating to billing preferences associated with a corresponding one of the plurality of portable user devices.

9. The method of claim 7, wherein each user profile includes information relating to security preferences associated with a corresponding one of the plurality of portable user devices.

10. The method of claim 7, wherein each user profile includes information relating to user preferences associated with a corresponding one of the plurality of portable user devices.

11. A base station comprising:
- means for receiving satellite radio signals containing satellite radio content directly by the base station, wherein the base station is deployed in a wireless network, wherein the base station is associated with an electronic serial number, and the electronic serial number is associated with an active satellite radio subscription which allows access to the satellite radio content contained in the satellite radio signals, wherein the satellite radio signals are provided by an entity that is different from an entity that provides the wireless network;
- means for encoding the satellite radio content using space time coding; and
- a first plurality of antennas for transmitting the space time coding encoded satellite radio content via a first wireless network protocol to a plurality of portable user devices, to allow each of the plurality of portable user devices to access the satellite radio content without individual active satellite radio subscriptions, wherein users of the plurality of portable user devices are subscribers of the wireless network.

12. The base station of claim 11, wherein the means for receiving comprises at least one of the first plurality of antennas.

13. The base station of claim 11, wherein the space time coding encoded satellite radio content is received at a portable user device of the plurality of portable user devices comprising:
- a second plurality of antennas for receiving the space time coding encoded satellite radio content transmitted via the first wireless network protocol; and
- means for decoding the space time coding encoded satellite radio content.

14. The base station of claim 13, wherein the first plurality of antennas comprises four antennas and the second plurality of antennas comprises two antennas.

15. The base station of claim 11, wherein the space time coding encoded satellite radio content is received at a wireless access point comprising:
- a second plurality of antennas for receiving the space time coding encoded satellite radio content transmitted via the first wireless network protocol and transmitting the space time coding encoded satellite radio content via a second wireless network protocol.

16. The base station of claim 15, wherein the first wireless network protocol is an IEEE 802.16 protocol and the second wireless network protocol is an IEEE 802.11 protocol.

17. The base station of claim 11, wherein the space time coding encoded satellite radio content is received at a wireless access point comprising:
- a second plurality of antennas for receiving the space time coding encoded satellite radio content transmitted via the first wireless network protocol and transmitting decoded satellite radio content via a second wireless network protocol; and
- means for decoding the space time coding encoded satellite radio content.

18. A base station comprising:
- a plurality of antennas;
- a satellite radio receiver for directly receiving satellite radio signals containing satellite radio content, wherein the base station is deployed in a wireless network, wherein the base station is associated with an electronic serial number, and the electronic serial number is associated with an active satellite radio subscription which allows access to the satellite radio content contained in the satellite radio signals, wherein the satellite radio signals are provided by an entity that is different from an entity that provides the wireless network;
- a space time coding encoder to encode the satellite radio content using space time coding; and
- a wireless transmitter to transmit the space time coding encoded satellite radio content from the plurality of antennas via a wireless network protocol to a plurality of portable user devices, to allow each of the plurality of portable user devices to access the satellite radio content without individual active satellite radio subscriptions, wherein users of the plurality of portable user devices are subscribers of the wireless network.

19. The base station of claim 18, further comprising:
- a decryptor for decrypting the satellite radio signals based on the electronic serial number to access the satellite radio content contained in the satellite radio signals.

20. The base station of claim 18, wherein the satellite radio receiver receives the satellite radio signals via at least one of the plurality of antennas.

21. The base station of claim 18, wherein the wireless network protocol comprises one of: an IEEE 802.16 protocol and an IEEE 802.11 protocol.

22. The base station of claim 18, further comprising:
- a database storing a plurality of user profiles, each user profile corresponding to an identifier of a portable user device of the plurality of portable user devices.

23. The base station of claim 22, wherein each user profile includes information relating to billing preferences associated with a corresponding one of the plurality of portable user devices.

24. The base station of claim 22, wherein each user profile includes information relating to security preferences associated with a corresponding one of the plurality of portable user devices.

25. The base station of claim 22, wherein each user profile includes information relating to user preferences associated with a corresponding one of the plurality of portable user devices.

* * * * *